March 23, 1948.  A. G. PARKER  2,438,182

MOTION TRANSMITTING UNIT

Filed July 16, 1945  2 Sheets-Sheet 1

INVENTOR
A.G. PARKER
by Fetherstonhaugh &Co.
ATTORNEYS

March 23, 1948.  A. G. PARKER  2,438,182
MOTION TRANSMITTING UNIT
Filed July 16, 1945  2 Sheets-Sheet 2

INVENTOR
A. G. PARKER
BY Fetherstonhaugh & Co.
ATTORNEYS

Patented Mar. 23, 1948

2,438,182

UNITED STATES PATENT OFFICE 2,438,182

MOTION-TRANSMITTING UNIT

Arnold G. Parker, Longueuil, Quebec, Canada

Application July 16, 1945, Serial No. 605,309

6 Claims. (Cl. 74—60)

1

This invention relates to improvements in motion-transmitting units of the kind in which an inclined disk of the swash-plate or wobbler type is employed for converting rotary oscillating motion into linear or reciprocating motion.

Various units of this type have been proposed in which the inclined disk is fixed to rotate with a supporting shaft which is journalled in stationary bearings and is oscillated about a central longitudinal axis to impart reciprocating movement to a rod or other driven element through the agency of the inclined disk and a cooperating yoke or yoke ring. In such units the yoke ring is operatively connected to the inclined disk and is mounted to oscillate about an axis which intersects the first mentioned axis at an angle of 90° and is coplanar therewith. In some units of this type, provision is made for adjusting the inclination or obliquity of the disk with reference to its supporting shaft.

The general object of the present invention is to provide an improved motion-transmitting unit of the character described which, in comparison with known units of similar type, has a much wider range of useful application.

One improvement afforded by the present invention consists in mounting the inclined disk on a supporting shaft which, in addition to being rotatable about a central longitudinal axis, is also capable of bodily tilting movement about a transverse axis. With this arrangement reciprocating motion may be transmitted to the rod or other driven element through the agency of the inclined disk and the cooperating yoke or yoke ring by (a) rotating the disk-carrying shaft about its central longitudinal axis, or (b) tilting said shaft about said transverse axis. The rotary and tilting movements of the shaft may be performed either successively or simultaneously.

Another improvement afforded by the present invention comprises assembling the component parts of the motion-transmitting unit so that, in certain maximum travel positions in which the inclined disk and the cooperating yoke assume coplanar positions, the yoke is locked against operation by the rod or other driven element connected therewith but will operate in response to either rotary or tilting movement of the disk-carrying shaft.

Other characteristic features and advantages of the invention will be more readily understood from the following detailed description taken in connection with the accompanying drawings, in which—

Fig. 1 is a top plan view of a motion-transmit-

2 ting unit constructed in accordance with my invention. In this view the operating parts are shown in what is termed the neutral position.

Figure 6:
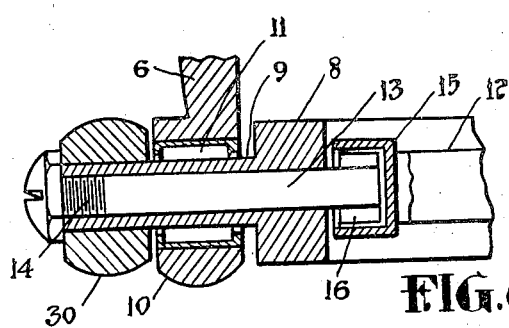
Fig. 6 is a sectional view taken substantially along the line 6—6 of Fig. 1 and shows the manner in which the primary member and the yoke ring are mounted to swing about a common axis transverse to the axis of rotation of the disk-carrying shaft.

Referring more particularly to the drawings, 5 designates a bracket including parallel arms 6 projecting from a base plate 7. An open frame member 8, hereinafter referred to as the primary member of the motion-transmitting unit, is equipped with hollow trunnions 9 rigidly secured thereto (see Fig. 6) and extending outwardly through bearing housings 10 provided at the free ends of the bracket arms 6. The trunnions 9 are preferably journalled in the bearing housings 10 by suitable anti-friction bearings 11. Primary member 8 is thus mounted to oscillate about the axis C—D.

A yoke ring 12 is also mounted to oscillate about axis C—D by means of two supporting shafts 13 extending inwardly through the hollow trunnions 9. The shafts 13 are fixed to rotate with the trunnions 9 by the threaded connections 14 or any other suitable means. The inner ends of shafts 13 extend into bearing housings 15 provided at the opposite sides of the yoke ring 12 and are preferably journalled in anti-friction bearings 16.

A shaft 18 extends through yoke ring 12 at right angles thereto and has end portions thereof journalled in anti-friction bearings 19 contained in bearing housings 20 afforded by diametrically opposite portions of the primary member 8. It will thus be seen that shaft 18 is journalled to rotate about an axis A—B which intersects the axis C—D at right angles and is coplanar therewith. Shaft 18 carries a swash-plate or wobbler disk 22 which is fixed to rotate therewith and is obliquely inclined with reference to the axis A—B. A strap ring 24 extends around the periphery of disk 22 and is mounted thereon by an annular anti-friction bearing 25 (see Fig. 5) which retains the strap ring and disk in coplanar relation. The strap ring 24 carries diametrically opposite trunnions 26 which lie on an axis at right angles to the yoke-supporting shafts 13 and are journalled in anti-friction bearings 27 carried by the yoke ring 12. The yoke ring 12 is also provided with ears 27' to which one end of a rod 28 or other motion-transmitting element is secured by a pivot pin 29.

The shaft 18, disk 22 and disk-encircling strap ring 24 conjointly constitute what is hereinafter termed the secondary member of the motion-transmitting unit.

One of the hollow trunnions 9 of primary member 8 is extended beyond its bearing housing 10 and equipped with an operating lever 30 which may be operated by any suitable means to oscillate the primary member 8 about the axis C—D and thereby effect bodily tilting movement of the secondary member comprising shaft 18, disk 22 and strap ring 24 about the same axis. Owing to the trunnion connection provided between the yoke ring 12 and the disk-encircling strap ring 24 it will be obvious that the bodily tilting movement of disk 22 about axis C—D will result in oscillating movement of yoke ring 12 about the same axis and thereby effect linear or reciprocating movement of the rod or driven element 28.

One end of shaft 18 is also extended beyond the adjacent bearing housing 20 and equipped with a gear 18a meshing with a larger gear 18b fixed to a shaft 18c to which one end of an operating lever 32 is rigidly secured. Lever 32 may be actuated by any suitable means to oscillate shaft 18 about the axis A—B. This rotary oscillation of shaft 18 about axis A—B serves, through the agency of the inclined disk 22 and the strap ring 24, to oscillate yoke ring 12 about axis C—D and thereby impart linear or reciprocating movement to the rod 28 or other driven element.

From the foregoing it will be seen that linear motion may be imparted to the rod or driven element 28 by (a) turning the shaft 18 in either direction about the axis A—B or (b) tilting the primary member 8 and the shaft 18 in either direction about the axis C—D. It will also be apparent that these movements of shaft 18 about axes A—B and C—D may be performed successively in any desired sequence or may be performed simultaneously.

Figure 1:
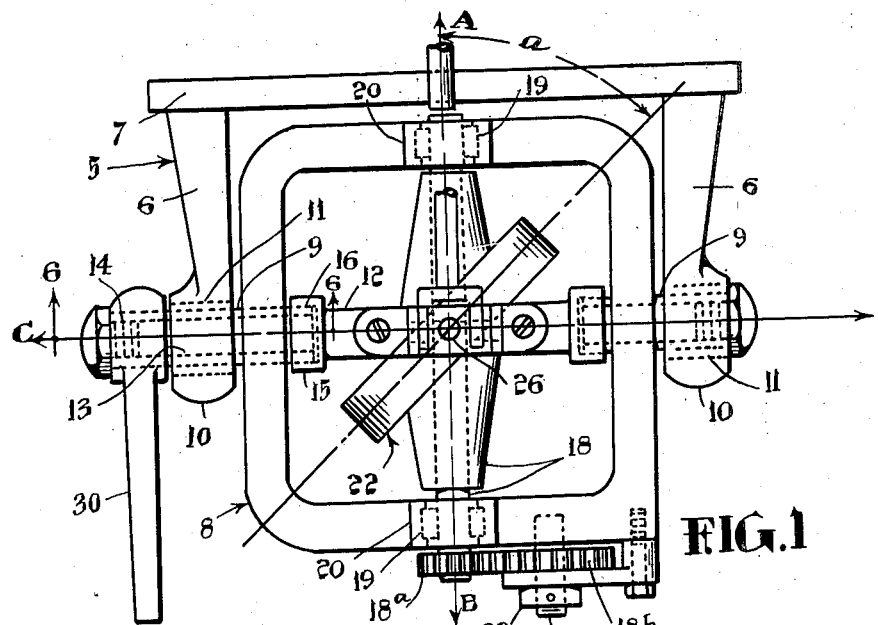
Figure 2:
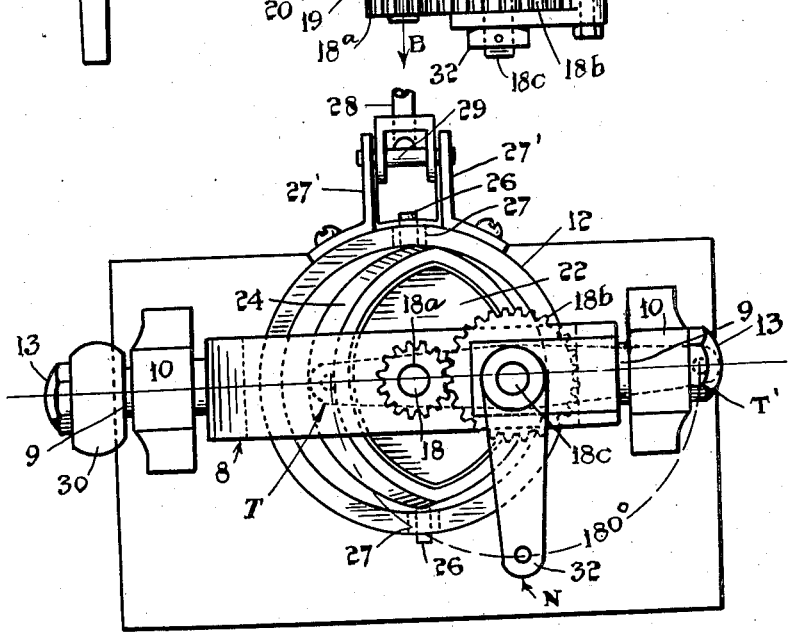
Fig. 2 is a front view of the assembly shown in Fig. 1.

The motion-transmitting unit described herein is designed so that, in the neutral position thereof, the operating parts will be arranged as shown in Figs. 1 and 2. In this condition of the unit the primary member 8 lies in a horizontal plane, the yoke 12 lies in a vertical plane perpendicular to the plane of the primary member, and the disk 22, as viewed in top plan, extends obliquely across the axis A—B at an angle a determined by design requirements. The trunnions 26 are positioned directly above and below the intersection of the axes A—B and C—D.

The relative angular setting of disk 22 and lever 32 on shafts 18 and 18c is such that, in the neutral condition of the unit, lever 32 extends downwardly from shaft 18c as shown by full lines in Fig. 2. In the present instance the lever 30, which operates primary member 8, is also shown fixed to its trunnion 9 so that it lies in a horizontal plane in the neutral condition of the unit.

Figure 4:
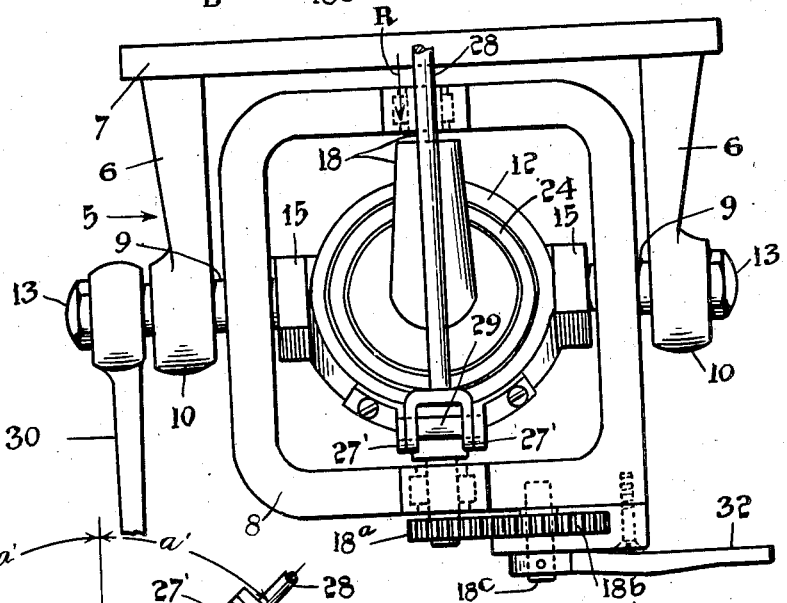
Fig. 4 is a view similar to Fig. 1 but showing the disk and yoke in the other maximum travel coplanar positions to which these parts are shifted when the disk-carrying shaft is turned through the maximum permissible angle in the opposite direction from its neutral setting.

Lever 32 is connected to operating mechanism (not shown) so that (as indicated by dotted lines) it may be swung upwardly in either direction from its neutral position N to either of the maximum travel positions T or T' to thereby rotate shaft 18 through an angle of 180° from its neutral position. It will thus be seen that shaft 18 has a total travel of 180° from one maximum travel position to the other. When lever 32 is swung to the right from neutral position N to rotate shaft 18 in a clockwise direction through an angle of 180° the disk 22 and yoke 12 are shifted to the coplanar and yoke-locking positions shown in Fig. 4 and the driven element or rod 28 is moved its maximum distance in the direction indicated by the arrow R. In this coplanar position of the disk 22 and yoke 12 the latter is locked against movement in response to any pull or thrust exerted thereon by the rod or driven member 28.

Figure 3:
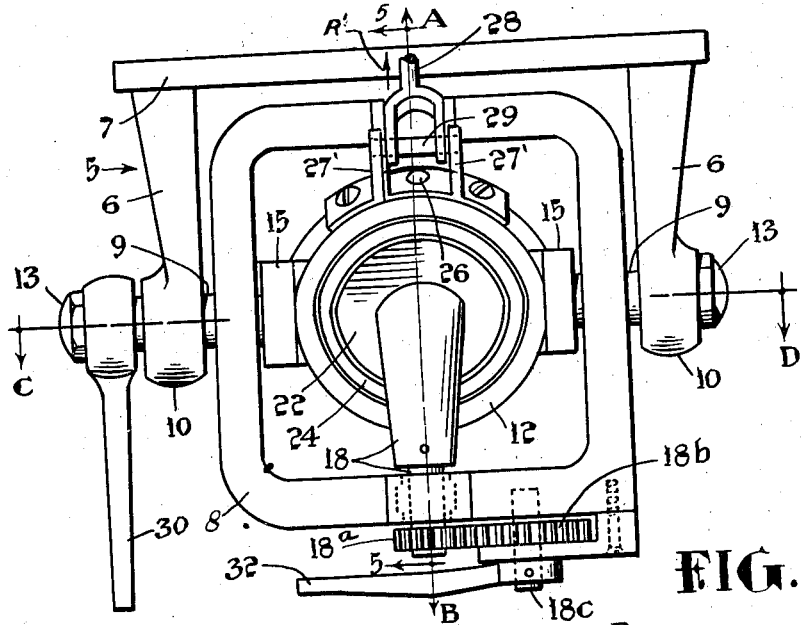
Fig. 3 is a view similar to Fig. 1 but showing the inclined disk and cooperating yoke in one of the coplanar maximum travel positions to which these parts are shifted when the disk-carrying shaft has been turned through a predetermined maximum angle in one direction from its neutral setting.

When the lever 32 is moved to the left from the neutral position N to rotate shaft 18 through an angle of 180° in a counter-clockwise direction the disk 22 and yoke 12 are shifted to the coplanar position shown in Fig. 3 and the rod or driven member 28 is shifted the maximum distance in the direction indicated by arrow R'. In this second coplanar maximum travel position of disk 22 and yoke 12, the latter is also locked against movement in response to any pull or thrust of the driven member.

The aforesaid locking of yoke 12 in either of its maximum travel positions is a very important feature in cases where it is desirable that the driven member 28 be effectively retained in either of the two extreme positions to which it is shifted by the yoke. This feature is important, for example, in cases where the motion-transmitting unit is employed for extending or retracting the undercarriage of an aircraft as set forth in my copending application Ser. #605,310, filed July 16, 1945, and it has the advantage of eliminating the necessity of resorting to the use of intricate locking pins, catches or other locking devices which are now employed for securing the undercarriage in either its retracted or extended position. The self-locking of the yoke 12 is also of advantage in connection with various other applications of the motion-transmitting unit described herein.

The angle through which primary member 8 may be oscillated about axis C—D through the agency of lever 30 and operating mechanism connected to said lever is a variable factor.

In the practical application of this invention the driven member 28 may be moved to either of its extreme positions or to any intermediate position by swinging lever 32 in either direction from its neutral position N. Driven member 28 may be similarly operated by moving the lever 30 to swing the primary member 8 in either direction from its neutral position. If desired, the two levers 30 and 32 may be suitably connected to a single operating element such as a hand lever so that the rotary and bodily tilting movements of shaft 18 may be accomplished either successively or simultaneously by appropriate movement of said operating element. Levers 30 and 32 may also be connected to entirely separate operating mechanisms which may be put into operation either successively or simultaneously.

The motion-transmitting unit described herein is intended for general application and its usefulness is substantially increased by the fact that the rod or driven element may be operated by (a) oscillating the shaft 18 in either direction about the axis A—B or (b) tilting said shaft in either direction about the axis C—D. This is illustrated, for example, by the arrangement shown in my copending application Serial No. 605,310 filed July 16, 1945, in which two units designed in accordance with the present invention are incorporated in an aircraft control system to conjointly provide a simple and efficient mechanism for controlling the action of the ailerons. In this application of the invention the bodily tilting movement of the primary members of the two units is employed for controlling the droop angle of both ailerons and the rotary oscillating movement of the disk carrying shafts of said units is employed for swinging the ailerons vertically in different directions for controlling the aircraft about its longitudinal axis.

The magnitude of the angular motion imparted to the yoke ring 12 by rotation of disk 22 is governed by the angle at which the disk is set in relation to its axis and this angle may be varied for different applications.

Figure 5:
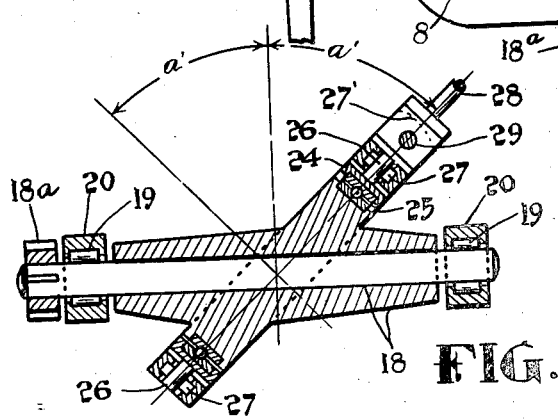
Fig. 5 is a sectional view taken substantially along the section line 5—5 of Fig. 3 and shows the mounting and assembly of the disk-carrying shaft, the inclined disk mounted thereon and the cooperating disk-actuated yoke ring.

Angular movement of lever 32 to rotate shaft 18 through its prescribed angle of 180° imparts to yoke 12 a total angular movement about axis C—D which is equal to twice angle a' indicated in Fig. 5, this angle being a measure of the distance which the yoke travels to either side of its neutral vertical position. Owing to the angular arrangement of disk 22 on shaft 18, this movement of yoke 12 proceeds at varying velocity in response to constant velocity movement of lever 32.

From the foregoing it will be seen that, in the specific arrangement shown in the present drawings, the angular motion imparted to yoke 12 by movement of lever 32 to operate shaft 18 to maximum travel position in one direction is equal to the reverse angular motion imparted to said yoke by movement of lever 32 to operate shaft 18 to its maximum travel position in the opposite direction. This is so because, in the neutral position of lever 32 and disk 22, yoke 12 lies in the neutral vertical position shown in Fig. 1 and the yoke actuating trunnions 26 are positioned directly above and below the intersection of axes A—B and C—D. For some applications of the motion-transmitting unit described herein it is important that the angular motion of yoke 12 in a given direction about axis C—D be greater or less than the reverse angular motion of the yoke about said axis.

This is easily provided for by initially assembling the component parts of the unit so that, when lever 32 is in the neutral position N (Fig. 2) the disk 22 will be in some other position than that shown in Fig. 1 and the yoke 12 will lie in a position inclined either forwardly or rearwardly from the vertical position shown in Figure 1. Depending on the direction in which the yoke 12 is so inclined the angular motion thereof in the direction indicated by arrow R in Fig. 4 will be greater or less than the angular motion in the reverse direction indicated by the arrow R' in Fig. 3. One example of the utility of this modification is described and illustrated in my copending application Serial No. 605,310, filed July 16, 1945, in which two motion-transmitting units embodying my invention are included in an aircraft aileron control system to provide a differential operating mechanism for actuating the ailerons to vary the lift of the aircraft or to maintain it on an even keel. In this application of my invention the yokes of the two coordinated motion-transmitting units are employed for swinging the ailerons vertically in opposite direction to control the aircraft about its longitudinal axis and are arranged so that the aileron raising motion of each yoke is greater than its aileron lowering motion.

In many applications such, for example, as that disclosed in my said copending application Serial No. 605,310 the shaft 18 has a total angular travel of less than 180° from one extreme position to the other and the self-locking feature of the unit is not utilized. In such applications it is feasible to dispense with the gears 18a and 18b and to secure lever 32 directly to shaft 18.

I claim:

1. A motion-transmitting unit comprising a shaft, means for rotating said shaft about its central longitudinal axis, means for tilting said shaft about a transverse axis, an inclined disk carried by said shaft, a yoke through which said shaft extends, means mounting said yoke for swinging movement about said transverse axis and means interconnecting said yoke and disk so that swinging movement is imparted to the yoke by either rotary or tilting movement of said shaft.

2. A motion-transmitting unit as set forth in claim 1, in which the means for tilting the shaft about said transverse axis comprises a primary member in which the shaft is rotatably journalled, means mounting said primary member for swinging movement about an axis constituting said transverse axis and means for imparting swinging movement to said primary member.

3. A motion-transmitting unit comprising stationary bearings, a primary member provided with hollow trunnions journalled in said bearings, shafts extending through said hollow trunnions and positioned to rotate therewith, a yoke supported on the inner ends of said shafts for swinging movement relatively to said primary member, a shaft passing through said yoke and having its ends rotatably journalled in bearings carried by said primary member, a disk carried by and rotatable with said shaft, said disk being obliquely inclined with reference to the central axis of said shaft and means interconnecting said disk and yoke so that swinging movement is imparted to the yoke when (a) said shaft is rotated about its central longitudinal axis, or (b) said shaft is tilted about a transverse axis in response to swinging movement of the primary member about the axis afforded by said trunnions.

4. A motion-transmitting unit comprising a primary member and a yoke mounted for independent swinging movement about a common fixed axis, a shaft extending through the yoke and having its ends rotatably journalled in bearings carried by the primary member, a disk carried by and rotatable with said shaft, said disk being obliquely inclined with respect to the central axis of said shaft and means interconnecting the disk and yoke so that the yoke is swung about its fixed axis in response to (a) rotation of the shaft in either direction about its central longitudinal axis, or (b) swinging movement of the primary member and shaft in either direction about the fixed axis of the primary member.

5. A motion-transmitting unit as set forth in claim 1, in which the yoke and disk are relatively arranged so that the swinging movement of the yoke in one direction in response to a predetermined rotary movement of the shaft from a given neutral position is greater than the swinging movement imparted to the yoke in response to an equal rotary movement of the shaft in the opposite direction from its neutral position.

6. In self-locking actuating mechanism of the character described, a motion-transmitting unit comprising a shaft, means mounting said shaft for rotation on its central longitudinal axis, an inclined disk carried by the shaft and fixed to rotate therewith, a yoke through which said shaft extends, means mounting said yoke for swinging movement about an axis intersecting said shaft axis at right angles thereto and passing through the disk-carrying portion of the shaft, means interconnecting said yoke and disk so that swinging movement is imparted to the yoke by the disk in response to rotation of the shaft, shaft operating means through which torque is applied to said shaft to rotate it through only a partial revolution in either direction to either of two predetermined positions of rest in which the disk and yoke are disposed in a coplanar position and in which the means interconnecting said yoke and disk is positioned so that loads transmitted to the shaft through said yoke and disk are ineffective to rotate the shaft on its axis.

ARNOLD G. PARKER.